Aug. 10, 1943.  E. W. CARLSON ET AL  2,326,618

TIRE CHAIN ASSEMBLY

Filed March 31, 1941

Eric W. Carlson
Carl H. Brainard  Inventor

By Arthur H. Sturges  Attorney

Patented Aug. 10, 1943

2,326,618

UNITED STATES PATENT OFFICE 2,326,618

TIRE CHAIN ASSEMBLY

Eric W. Carlson and Carl H. Brainard, Omaha, Nebr.

Application March 31, 1941, Serial No. 386,028

9 Claims. (Cl. 152—242)

This invention relates to automobiles and more particularly to anti-skid traction devices for the wheels of vehicles.

It is an object of the invention to provide means for attaching anti-skid chains across the periphery of the tire of a vehicle wheel in a position of use without jacking up said wheel and without laying a tire chain assembly upon the ground and causing the wheel to be driven upon top of said assembly as heretofore.

Another object of the invention is to provide a device for the above stated purposes which may be also attached by an operator in a position ready for immediate use and while the operator stands at the outside of said wheel and without the necessity as heretofore of joining together the free ends of the side chain of a tire chain assembly at the inner side of said wheel.

Other and further advantages of the invention will be obvious from the following detailed description thereof.

As heretofore practiced in the art numerous devices have been designed which employ rigid members at each side of a vehicle wheel to which cross chains are attached, said rigid members being pivotally connected together for defining a circular support for said cross chains and having the disadvantage that ends of said rigid members must be manually connected together prior to use; other of said prior devices employ cables associated with anti-skid cross chains, said devices being complicated and expensive to manufacture and having the further disadvantage of uncertain operation resultant from the employment of springs and still other of said prior devices employ rigid members pivotally connected together to define a circular configuration and requiring chains for connecting the free ends of the circular configuration thereof together, said chains, in use, being loose thereby generating rattling noises and having other objectionable factors. Also said prior devices require that an operator must kneel down upon a roadway in order to hook the free ends of the inner annular portions of said prior devices together before use whereby he often soils his clothing and in all instances requires time for said hooking and the present invention aims to provide means for obviating said undesirable features of the prior art.

Figures 1, 2:
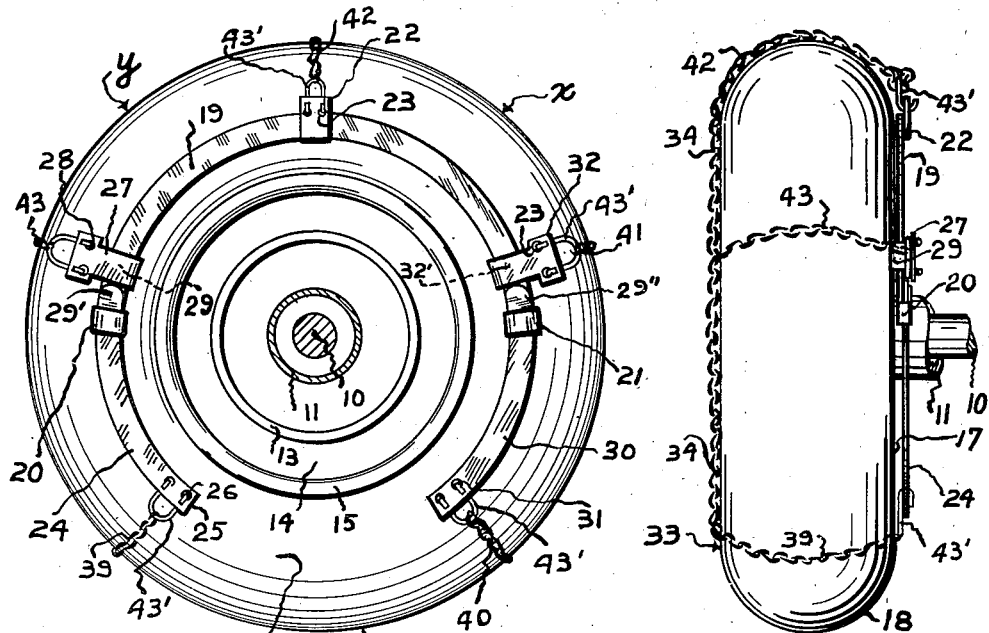
Figure 1 is an elevation of the inner side of a pneumatic tire mounted on a vehicle wheel and showing the inner side of the new device applied thereto in a position of use.
Figure 2 is a rear elevation of said tire, a rear axle housing for said wheel showing fragmentarily and showing the new device applied in a position of use to said tire and with respect to said housing.

Referring to the drawing 10 indicates an automobile axle or the like which may extend through a bearing or housing 11, as best shown in Figure 2. A brake drum is indicated at 13, 14 indicates a disk wheel and 15 the felloe thereof, as shown in Figure 1.

Figure 3:
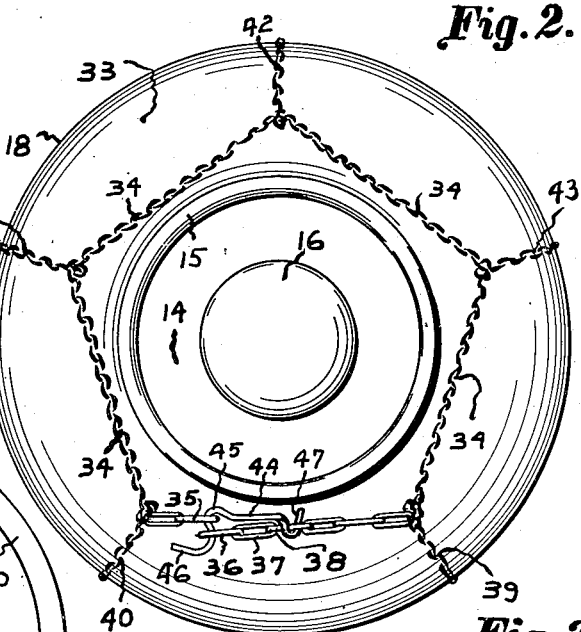
Figure 3 is a vertical elevation of the outer side of said tire, wheel and new device.

Referring to Figure 3, 16 indicates a hub cap carried by said wheel and as thus described it will be understood that the outer surface 17 of the side wall of the pneumatic tire 18 is disposed toward the axle 10 whereby said side wall constitutes the inner side of the tire 18.

The new device includes a plurality of sections or segments each of arcuate contour in plan, preferably three thereof being employed for wheels of conventional size and formed of rigid, preferably malleable iron, bars.

The section 19 is substantially semi-circular in plan having rigidly attached to each of its ends the metallic straps respectively indicated at 20 and 21, said strap portions of the member 19 encircling later described other arcuate sections of the new device. Midway between the ends of the member 19 a tang 22 is provided formed integral with, welded or otherwise suitably secured to the member 19, said tang extending outwardly, being provided with one or more apertures 23 for facilitating attaching of one end of one of several later described anti-skid cross chains.

Figure 5:
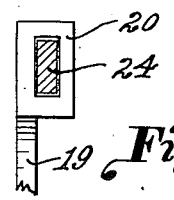
Figure 5 is an end elevation of a strap disposed at an end of a fragmentary portion of a curvilinear bar employed integral therewith and showing a second bar in section, the latter being disposed through the loop of the strap.

A rigid arcuate bar or member 24 is slidably disposed through the loop of the strap 20, as shown in Figure 5, said member 24 defining in plan approximately one-fourth of a circle. The end 25 of the member 24 is provided with one or more apertures 26 for facilitating attachment thereto of one end of one of said anti-skid cross chains. The other end of the member 24 which extends through the said loop of the strap 20 is provided with a tang 27 the latter preferably being T-shaped in plan and having one or more apertures 28 for facilitating attachment of a cross chain thereto. The tang portion 27 of the member 24 is further provided, as best shown in Figure 2, with a loop portion 29 which extends about the bar 19 and preferably the bar 24 carries a detent lug 29'.

The bar 30 which is similar to the bar 24 is slidably disposed through the strap 21 of the bar 19, having at one end one or more apertures 31 for purposes similar to the aperture 26. The other end of the bar 30 is provided with a tang 32 preferably of T-shape, a loop 32' which extends about the bar 19 and a detent lug 29".

The detent lugs 29' and 29" are preferably employed at times when the device of the present invention is for use on large vehicle truck wheels and for heavy duty since said detent lugs, being formed integral with their respective bars 24 and 30, reinforce said bars where the latter overlap the bar 19 during use and assist in maintaining said bars in parallelism, whereby other portions of the bars 24 and 30 may be comparatively thinner and lighter. For conventional purposes such as use upon comparatively smaller automobile wheels the reinforcing detent lugs or stops 29' and 29" may be dispensed with since the tangs 27 and 32 carried, respectively, by the bars 24 and 30 will serve as stops or detents for limiting sliding movements of said bars with respect to the bar 19 at times when said tangs strike against the straps 20 and 21 carried, respectively, on the outer ends of the bar 19. Also the lugs 29' and 29" are preferably employed at times when it is desired to fill the space between the tangs 27 and 32 and their respective straps 20 and 21 at the time the bars 24 and 30 are extended, for providing as shown in Figure 1, even spacing apart of certain later described cross chains when applied to different wheel sizes and for this purpose the lugs are preferably attached to the bars 24 and 30 removably by means of screws. The tangs 27 and 32 being provided with loops 29 and 32', respectively, said loops extending around the bar 19 are employed for a dual purpose, since said loops serve as attaching guides in conjunction with their respective tangs for guiding their respective bars 24 and 30 with respect to the bar 19 during sliding movements of said bars and also serve as detents or stops at times when the lugs 29' and 29" are dispensed with since said tangs and their strap portions then strike their respective straps 20 and 21 during sliding movements of the bars 24 and 30 with respect to the bar 19 for limiting said sliding movements.

As thus described it will be understood that the plurality of arcuate sections 19, 30 and 24 are slidably secured together with respect to each other whereby the bar 30 may be moved in one direction until the tang 32 thereof strikes the tang 22 of the bar 19 and in an opposite direction until the detent-lug 29" strikes the band 21 of the bar 19, and similarly the bar 19 may slide through the loop 29 of the tang 27 carried by the bar 24 until the tang 27 contacts with the tang 22. While the bar 19 is stationary either one or both of the bars 24 and 30 may slide with respect to the bar 19 singly or simultaneously, the construction being such that at times when the tangs 27 and 32 are adjacent the tang 22 of the bar 19 and the straps 20 and 21 of the bar 19 are downward that the bars 24 and 30 slide by operation of gravity to an extended position, as shown in Figure 1, said guide loops 29 and 32' in conjunction with straps 20 and 21 holding the bars in parallelism at all times.

Referring to Figure 3 the outer side surface 33 of the outside wall of the tire, namely, that wall which is disposed furthest away from the axle 10 in the use of the new device is provided with an elongated flexible member 34 which is partially diagrammatically shown in Figure 3. The flexible member 34 may be formed of chain links, cable or the like and chain links are included at each of the normally free ends thereof, such as the link 35 at one end of said member 34, the links 36, 37 and 38 at its other end.

Adjacent said normally free ends of the member 34 ends of the anti-skid cross chains 39 and 40 are secured by any suitable means, the other ends of said cross chains, as best shown in Figure 1, being respectively attached to the free ends of the rigid bars 24 and 30, by a suitable means. Intermediate the cross chains 39 and 40 ends of further anti-skid cross chains 41, 42 and 43 are connected to the member 34 in spaced apart relation, the other ends of said anti-skid cross chains 41, 42 and 43, as best shown in Figure 1, being respectively connected by a suitable means to the tang 32 of the bar 30, the tang 22 of the bar 19 and the tang 27 of the bar 24. Preferably the U-shaped double hook devices 43' are employed for removably securing ends of the cross chains to the slidable bars as shown in Figure 1.

Figure 4:
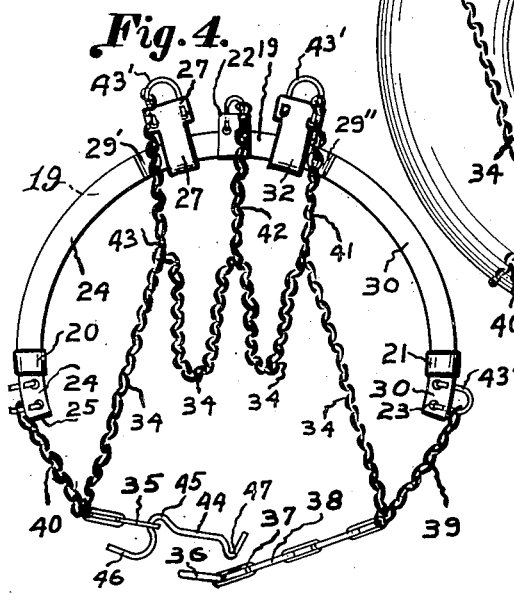
Figure 4 is a plan view of the new device and showing certain slidable rigid members in a contracted position with respect to each other, certain chains employed being in a limp condition.

Referring to Figures 3 and 4, a lever-shank 44 is provided having a loop 45 which extends through the link 35 said loop 45 being formed snugly about the link 35 whereby a pivotal connection is provided for the lever-shank 44 with said link. Adjacent said pivotal mounting and preferably formed integral with the shank 44 a hook 46 is provided which is in use adapted to extend through the link 36 of the member 34.

That end of the lever-shank 44 which is normally free, namely, that end which is furthest away from said pivotal mounting is provided with a second hook 47, the latter, as best shown in Figure 3, being adapted to extend, in use, through or about the link 38 although said hook may be so constructed and elongated that it may be hooked to any portion of the chain or flexible member 34 for purposes later described.

In operation the rigid arcuate bars while disposed in a contracted position with respect to each other, as shown in Figure 4, may be applied to a tire readily by resting the strap ends 20 and 21 upon the upper portion of the perimeter of the tire 18 adjacent the points indicated at X and Y in Figure 1 and while said contracted bars are disposed in a horizontal position, said chains being limply disposed, approximately, as shown in Figure 4, at the outer side of said tire, the operator slides the straps 20 and 21 toward the body of the vehicle and between the fender and said tire, permitting said straps 20 and 21 to extend downwardly at the inner side of the tire until the weight of the members 30 and 24 causes said members to extend downwardly by operation of gravity whereby said extended portions define at least a major portion of a circle in plan about the axle 10 as shown in Fig. 1; whereupon said operator without moving to a new location inserts the hook 46 through the link 36 and presses downwardly upon the lever-shank 44 for drawing the flexible member 34 substantially taut, as shown in Figure 3, and then manually causes engagement of the hook 47 with the member 34 or through or about the link 38 for maintaining said taut condition and as thus described it will be noted that said free outer ends of the members 24 and 30 are prevented from movement in one direction, said free ends being prevented from movement in the other direction by the engagement of either the detent lugs 29' and 29" respectively against the guide-strap-detents 20 and 21 in cases where said lugs are employed, or the engagement of the strap-detents consisting of the tangs 27 and 32 and the loops respectively against the straps 20 and 21 in instances where said lugs are omitted from the construction.

As thus described it will be understood that the loop or strap portions 29 and 32' respectively of the tangs 27 and 32 not only serve, in conjunction with the straps 20 and 21, to hold the bars 24 and 30 in parallelism with the bar 19, but also serve as stops or detents for limiting slidable, extensible movements of the bars 24 and 30 with respect to the bar 19. As thus described it will be noted that said antiskid cross chains may be applied across the periphery of the tire in less than a minute of time without the operator soiling his clothing and while standing in one position without either jacking up the wheel 14 or otherwise moving said wheel. It will be further noted that a highly advantageous feature of the new device is that a hooking together of the outer ends of the members 24 and 30 is not necessary since they are maintained fully extended and in a position of use for spacing the cross chains apart regularly and at times when the lever 44 is manipulated for said purpose.

The new device may be removed from an automobile wheel with substantially equal facility and for this purpose the vehicle is caused to rotate the wheel 14 upon the ground until the outer ends of the members 24 and 30 are disposed upwardly and in a reverse position to the showing thereof in Figure 1; whereupon the hook 47 is released and the lever 44 manipulated for permitting the side chain 34 to become slack whereby the arms 24 and 30 slide by gravity toward the tang 22 of the member 19, the structure as a whole collapsing and falling away from about the axle housing 11 and upon the ground. At this time the operator may employ the engine of the vehicle to cause the latter to move away from the new device thereby readily freeing the latter from the tire 18.

The number of cross-chains 39, 40, 41, 42 and 43 are ample for ordinary purposes and may be fewer in number for purposes such as extricating an automobile which is trapped upon icy pavement adjacent a curbstone and unable to back out of a parking position unaided and for this latter mentioned purpose a couple of cross-chains is sufficient. However, the new device as to the slidable members 19, 24 and 30 must define, when extended, more than half a circle in plan for holding the new device in a position of use.

For vehicles having large wheels such as trucks, busses and the like a greater number of said cross-chains may be employed than the five specifically shown in Figure 1. Also many people desiring to drive their vehicle comparatively fast desire that the cross-chains be numerous whereby the perimeter of a wheel does not contact extensively with the roadway and the weight of the vehicle is carried upon the cross-chains during revoluble movements of a wheel, whereby the vibration generated by cross-chains striking the pavement during revoluble movements of a wheel is appreciably lessened. Additional cross-chains for any of the above stated purposes may be readily applied to the new device and where a great number of said chains are desired the members 19 24 and 30 are constructed proportionally longer than the showing thereof in Figure 1, whereby the outer free ends of the members 24 and 30 are closer together; a flexible chain provided having one end attached to the tang 27 and the other end thereof to the end 25 of the member 24, said chain being sufficient in length to permit the member 24 to be fully extended when said chain is taut. Ends of additional cross-chains are then attached to the said chain which extends between the end 25 and the tang 27 and the other ends of said cross-chains attached to the side chain 34 by any suitable means as heretofore described. Similarly a chain may be attached between the tangs 27 and 22 and additional cross-chains applied.

Further cross-chains may be similarly applied by providing a length of chain between the tangs 22 and 32 and still further cross-chains by providing a length of chain between the tang 32 and the outer free end of the member 30, said additional chains attached to said tangs and the ends of the members 24 and 30 being in all cases of such a length that the rigid members 24 and 30 may be fully extended with respect to the rigid member 19. The said additional cross-chains are preferably attached to the auxiliary additional chains disposed between said tangs and free ends preferably by means of double U-shaped hooks such as the hooks 43'.

From the foregoing description it is thought to be obvious that an anti-skid traction device constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish it to be understood as limiting ourselves to the precise arrangement and formation of the several parts herein shown in carrying out our invention in practice except as claimed.

What is claimed is:

1. A tire chain assembly comprising a rigid member of approximately semi-circular contour in plan having a guide-strap-detent at each end thereof, two rigid members each defining approximately 90 degrees of a circle in plan and each having a strap-detent at one of their ends disposed about said semi-circular member, the other ends of said 90 degree members being each disposed for sliding movements toward and away from each other respectively through one of said guide-strap-detents, whereby said members may be placed at the inner side of a vehicle tire and become extended in parallelism with respect to each other to define in plan a major portion of a circle, said strap detents also comprising means for limiting said sliding movements in conjunction with said guide-strap-detents, a flexible chain adapted to be disposed at the outer side of said tire, means for attaching the ends of said side-chain together, a plurality of anti-skid chains adapted to be disposed across the periphery of said tire, and means for attaching opposite ends of said cross-chains respectively to said side-chain and said rigid members.

2. A vehicle tire chain assembly comprising a chain for that side of said tire which is outwardly with respect to the body of said vehicle, anti-skid cross chains having ends spaced apart and secured to said side chain, a plurality of rigid bars of arcuate contour in plan so constructed and attached together that said bars are disposed substantially parallel for slidable and extensible movement with respect to each other, the other ends of said cross-chains being secured to said bars in spaced apart relation and slidable therewith, means for limiting said extensible movement of said bars for causing the latter to define in plan a major portion of a circle at the other side of said tire, and means for attaching the ends of said side-chain together tautly for maintaining said bars extended and said cross-chains in an operative position across the periphery of said tire during use.

3. A vehicle tire chain assembly comprising a chain for that side of said tire which is outwardly with respect to the body of said vehicle, anti-skid cross chains having ends spaced apart and secured to said side chain, a plurality of rigid bars of arcuate contour in plan so constructed and attached together that said bars are disposed substantially parallel for slidable and extensible movement with respect to each other, the other ends of said cross-chains being secured to said bars in spaced apart relation and slidable therewith, means for limiting said extensible movement of said bars for causing the latter to define in plan a major portion of a circle at the other side of said tire, a lever provided with a hook at each of its ends, said lever being pivotally connected between said hooks to a link of one of the ends of said side-chain, one of said hooks being adapted to be disposed through the end link of the other end of said side-chain and said lever swung for drawing said side-chain taut, the other said hook being adapted to engage a taut portion of said side-chain for maintaining said bars extended and said cross-chains in an operative position across the periphery of said tire during use.

4. In a support for anti-skid cross chains for a vehicle wheel tire, a pair of rigid arcuate sections, a guide carried by one section adjacent its end and slidably engaging the other section, a guide carried by the other section adjacent its end and slidably engaging the first section, said guides permitting relative sliding movement of the two sections in an arcuate path to form an arc in the retracted position of the sections which does not exceed a semi-circle and to form an arc in the extended position of the sections which substantially exceeds a semicircle in extent.

5. In a support for anti-skid cross chains for a vehicle wheel tire, a pair of rigid arcuate sections, a guide carried by one section adjacent its end and slidably engaging the other section, a guide carried by the other section adjacent its end and slidably engaging the first section, said guides permitting relative sliding movement of the two sections in an arcuate path to form an arc in the retracted position of the sections which does not exceed a semi-circle and to form an arc in the extended position of the sections which substantially extends a semicircle in extent, and means to hold the sections in their extended position.

6. In a support for anti-skid cross-chains for a vehicle wheel tire, a pair of rigid arcuate sections, guide means slidably connecting the sections and permitting relative sliding movement of said sections in an arcuate path to form an arc in the retracted position of the sections and to form a much longer arc in the extended position of the sections which longer arc forms the major portion of a circle.

7. In a support for anti-skid cross-chains for a vehicle wheel tire, a pair of rigid arcuate sections, guide means slidably connecting the sections and permitting relative sliding movement of said sections in an arcuate path to form an arc in the retracted position of the sections and to form a much longer arc in the extended position of the sections which longer arc forms the major portion of a circle, and means to hold the sections in their extended position.

8. In a support for anti-skid cross-chains for a vehicle wheel tire, a pair of rigid arcuate sections, guide means slidably connecting the sections and permitting relative sliding movement of said sections in an arcuate path to form an arc in the retracted position of the sections and to form a much longer arc in the extended position of the sections which longer arc forms the major portion of a circle, cross chains connected to said sections, and flexible means connecting said cross chains.

9. In a support for anti-skid cross-chains for a vehicle wheel tire, a pair of rigid arcuate sections, guide means slidably connecting the sections and permitting relative sliding movement of said sections in an arcuate path to form an arc in the retracted position of the sections and to form a much longer arc in the extended position of the sections which longer arc forms the major portion of a circle, cross chains connected to said sections, flexible means connecting said cross chains, and a locking member carried by said cross-chains and connecting member and disposed to secure the sections and cross chains upon a vehicle wheel tire with the arcuate sections held in their extended position.

ERIC W. CARLSON.
CARL H. BRAINARD.